(12) United States Patent
Ahn et al.

(10) Patent No.: US 11,905,371 B2
(45) Date of Patent: Feb. 20, 2024

(54) LOW FRICTION RESIN COMPOSITES

(71) Applicant: LG CHEM, LTD., Seoul (KR)

(72) Inventors: Kiho Ahn, Daejeon (KR); Jongsung Park, Daejeon (KR); Sang Woo Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 820 days.

(21) Appl. No.: 16/976,701

(22) PCT Filed: Aug. 14, 2019

(86) PCT No.: PCT/KR2019/010385
§ 371 (c)(1),
(2) Date: Aug. 28, 2020

(87) PCT Pub. No.: WO2020/036443
PCT Pub. Date: Feb. 20, 2020

(65) Prior Publication Data
US 2021/0047469 A1 Feb. 18, 2021

(30) Foreign Application Priority Data

Aug. 17, 2018 (KR) .................... 10-2018-0096135
Aug. 13, 2019 (KR) .................... 10-2019-0099149

(51) Int. Cl.
| *C08G 73/02* | (2006.01) |
| *C08K 7/06* | (2006.01) |
| *C08K 3/04* | (2006.01) |
| *C08K 3/30* | (2006.01) |
| *C08K 5/3417* | (2006.01) |
| *C08L 27/18* | (2006.01) |

(52) U.S. Cl.
CPC .............. *C08G 73/026* (2013.01); *C08K 3/04* (2013.01); *C08K 3/30* (2013.01); *C08K 5/3417* (2013.01); *C08K 7/06* (2013.01); *C08K 2003/3009* (2013.01); *C08K 2201/003* (2013.01); *C08L 27/18* (2013.01)

(58) Field of Classification Search
CPC .... C10M 107/50; C08G 73/02; C08G 77/452; C08K 7/06; C08K 3/04; C08K 3/30
USPC ........................................ 524/496
See application file for complete search history.

(56) References Cited

U.S. PATENT DOCUMENTS

| 4,408,035 A | 10/1983 | Keller |
| 5,003,039 A | 3/1991 | Keller |
| 5,003,078 A | 3/1991 | Keller |
| 5,004,801 A | 4/1991 | Keller et al. |
| 5,132,396 A | 7/1992 | Keller |
| 5,139,054 A | 8/1992 | Long et al. |
| 5,208,318 A | 5/1993 | Keller |
| 5,237,045 A | 8/1993 | Burchill et al. |
| 5,292,854 A | 3/1994 | Keller |
| 5,350,828 A | 9/1994 | Keller et al. |
| 5,686,521 A | 11/1997 | Massengale et al. |
| 6,001,926 A | 12/1999 | Sastri et al. |
| 2006/0194944 A1 | 8/2006 | Fowler et al. |
| 2012/0251021 A1* | 10/2012 | Swei ............... F16C 33/121 264/129 |
| 2013/0337271 A1 | 12/2013 | Yoshikawa et al. |
| 2017/0313892 A1 | 11/2017 | Park et al. |
| 2018/0346646 A1 | 12/2018 | Kim et al. |
| 2019/0211177 A1 | 7/2019 | Park et al. |
| 2019/0284338 A1 | 9/2019 | Kim et al. |

FOREIGN PATENT DOCUMENTS

| CN | 101712795 A | 5/2010 | |
| CN | 101891947 | 11/2010 | |
| CN | 102532896 A | 7/2012 | |
| CN | 103709746 A | 4/2014 | |
| CN | 103897346 A | 7/2014 | |
| EP | 3396183 A1 * | 10/2018 | ............... C08J 5/04 |
| EP | 3401351 A2 * | 11/2018 | ........... C08G 73/026 |
| EP | 3424982 A1 | 1/2019 | |
| JP | 60228558 A | 11/1985 | |
| JP | 10-509747 A | 9/1998 | |
| JP | 2006-45413 A | 2/2006 | |
| JP | 2008-530309 A | 8/2008 | |
| KR | 10-1151909 B1 | 5/2012 | |
| KR | 10-2014-0044778 A | 4/2014 | |
| KR | 10-2016-0115543 A | 10/2016 | |
| KR | 1020170065954 A | 6/2017 | |
| KR | 10-2017-0123770 A | 11/2017 | |
| KR | 10-2018-0047217 A | 5/2018 | |
| KR | 10-2018-0062396 A | 6/2018 | |
| WO | 2017/095174 A1 | 6/2017 | |
| WO | WO-2017119793 A2 * | 7/2017 | ........... C08G 73/026 |

OTHER PUBLICATIONS

US 5,922,807 A, 07/1999, Satya et al. (withdrawn)

* cited by examiner

*Primary Examiner* — Deve V Hall
(74) *Attorney, Agent, or Firm* — Bryan Cave Leighton Paisner LLP

(57) ABSTRACT

The present invention relates to a low friction resin composite comprising a binder comprising phthalonitrile-based resin, and three or more kinds of fillers dispersed in the binder.

12 Claims, 4 Drawing Sheets

Contact area = 1.3 cm²

LOW FRICTION RESIN COMPOSITES

CROSS-REFERENCE TO RELATED APPLICATIONS

This application is a National Stage Application of International Application No. PCT/KR2019/010385 filed on Aug. 14, 2019, which claims priority to Korean Patent Application No. 10-2018-0096135 filed on Aug. 17, 2018 and Korean Patent Application No. 10-2019-0099149 filed on Aug. 13, 2019 with the Korean Intellectual Property Office, the disclosures of which are herein incorporated by reference in their entirety.

TECHNICAL FIELD

The present invention relates to a resin composite that not only has low friction property, but also has excellent heat resistance, and relative friction component material using the same.

BACKGROUND OF ART

Recently, in the automobile industries, in order to increase energy efficiency, along with light weight, many efforts are being made to reduce friction at energy transfer parts such as a power train, a drive train, etc. This is because only 15% of the fuel used in the automobiles is transferred to the wheel, and 10% thereof is lost due to the friction of a driving part.

Thus, in order to reduce the friction of a driving part, plastic materials are being used in addition to metal products. Since a friction component prepared from the plastic material has self-lubricating property, it significantly contributes to the reduction of loss due to friction. However, under an environment generating high rotation and pressure, due to friction heat, the friction component made of plastic material can be deformed or fused.

Thus, high heat resistant super engineering plastics such as PEEK (polyether ether ketone), PAI (polyamide imide), PI (polyimide), etc., having high heat resistance and exhibiting low friction property are mainly used as relative friction component such as a bearing, a bushing, a thrust washer, or an oil seal, etc. However, PEEK is still inappropriate as a component exposed to an ultra high pressure and ultra high velocity environment due to relatively low heat resistance, and PAI and PI are limited in terms of the application as components due to low processibility and productivity, and high cost.

DETAILED DESCRIPTION OF THE INVENTION

Technical Problem

It is an object of the present invention to provide a low friction resin composite that not only has high heat resistance and excellent processibility, but also, exhibits improved low friction property.

It is another object of the present invention to provide relative friction component material prepared using the low friction resin composite.

Technical Solution

According to the present invention, a low friction resin composite comprising a binder comprising phthalonitrile resin and three or more kinds of filler on the binder, is provided.

According to the present invention, a relative friction component material prepared using the low friction resin composite is also provided.

Hereinafter, a low friction resin composite and relative friction component material using the same according to the embodiments of the invention will be explained in detail.

First, the technical the terms used herein are only to explain specific embodiments, and are not intended to limit the present invention.

A singular expression includes a plural expression thereof, unless it is expressly stated or obvious from the context that such is not intended.

As used herein, the term "comprise" is intended to designate the existence of practiced characteristic, number, step, constructional element or combinations thereof, and it is not intended to preclude the possibility of existence or addition of one or more other characteristics, numbers, steps, constructional elements or combinations thereof.

I. Low Friction Resin Composite

According to one embodiment of the invention, a low friction resin composite comprising: a binder comprising phthalonitrile-based resin; and three or more kinds of fillers dispersed in the binder, is provided.

As the result of continuous studies of the present inventors, it was confirmed that a resin composite comprising a binder comprising phthalonitrile-based resin and three or more kinds of fillers dispersed in the binder not only has excellent heat resistance and processibility, but also exhibits improved low friction property.

The low friction resin composite can provide relative friction component material having excellent durability and low friction property even under very high pressure and very high speed environment.

(1) Binder

In the low friction resin composite, phthalonitrile-based resin is included as a binder.

Specifically, the binder comprising phthalonitrile-based resin can be obtained by curing a composition containing a phthalonitrile-based compound by one or more curing agents selected from the group consisting of an amine-based compound, a hydroxy-based compound, and an imide-based compound.

The phthalonitrile compound can be a compound comprising 2 or more, or 2 to 20, or 2 to 16, or 2 to 12, or 2 to 8, or 2 to 4 phthalonitrile structures capable of forming phthalonitrile resin through the reaction with the curing agent.

Preferably, the phthalonitrile compound can be one or more compounds selected from the group consisting of compounds of the average compositional formula of the following Chemical Formula 1 or the average compositional formula of the following Chemical Formula 5:

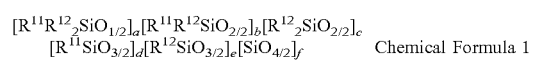

Chemical Formula 1 wherein in Chemical Formula 1:

each $R^{11}$ is independently, a substituent of the following Chemical Formula 2;

each $R^{12}$ is independently, hydrogen, alkyl, alkenyl, alkynyl, alkoxy, or aryl group;

each of a, b and c is a positive number;

each of d, e and f is 0 or a positive number; and a+b+c+d+e+f is 1;

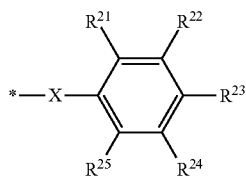

Chemical Formula 2 wherein in Chemical Formula 2:

X is a group connected to the silicon atom of the Chemical Formula 1, and is a single bond, an oxygen atom, a sulfur atom, $-S(=O)_2-$, a carbonyl group, an alkylene group, an alkenylene group, an alkynylene group, $-C(=O)-X^1-$ or $-X^1-C(=O)-$, and $X^1$ is an oxygen atom, a sulfur atom, $-S(=O)_2-$, an alkylene group, an alkenylene group, or an alkynylene group; and each of $R^{21}$ to $R^{25}$ is independently, hydrogen, an alkyl group, an alkoxy group, a hydroxyl group, a cyano group, or a substituent of the following Chemical Formula 3, and at least one of $R^{21}$ to $R^{25}$ is a substituent of the following Chemical Formula 3:

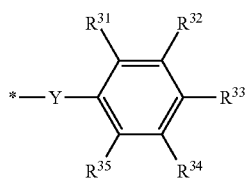

Chemical Formula 3 wherein in Chemical Formula 3:

Y is a single bond, an oxygen atom, a sulfur atom, $-S(=O)_2-$, a carbonyl group, an alkylene group, an alkenylene group, an alkynylene group, $-C(=O)-X^1-$ or $-X^1-C(=O)-$, and $X^1$ is an oxygen atom, a sulfur atom, $-S(=O)_2-$, an alkylene group, an alkenylene group, or an alkynylene group; and each of $R^{31}$ to $R^{35}$ is independently, hydrogen, an alkyl group, an alkoxy group, a hydroxyl group, or a cyano group, and two or more of $R^{31}$ to $R^{35}$ are cyano groups.

Throughout the specification, the description that a phthalonitrile compound is of a specific average compositional formula means that the phthalonitrile compound is a single compound of the compositional formula.

And, the description that a phthalonitrile compound is of a specific average compositional formula means that the phthalonitrile compound is a mixture of two or more different compounds, and that the compound is of the compositional formula if taking the average composition of the mixture.

The compound of the average compositional formula of Chemical Formula 1 can be a compound in the form of polymer or oligomer, and for example, the weight average molecular weight (Mw) can be in the range of 1000 to 50000 g/mol, or 2500 to 35000 g/mol, or 4000 to 20000 g/mol, or 6000 to 9000 g/mol.

The compound of the average compositional formula of Chemical Formula 1 has a weight average molecular weight of the above range, thus enabling the preparation of a polymerizable composition having low process temperature and/or wide process window.

Throughout the specification, the term "weight average molecular weight" is a numerical value converted in terms of standard polystyrene, measured by GPC (Gel Permeation Chromatograph), and the term "molecular weight" means weight average molecular weight unless otherwise described.

For example, the molecular weight is measured using Agilent PL-GPC 220 equipped with a PLgel MIXED-B column of 300 mm length (Polymer Laboratories). The measurement temperature is 160° C., 1,2,4-trichlorobenzene is used as a solvent, and the flow rate is 1 mL/min. A sample is prepared at a concentration of 10 mg/10 mL, and then, is fed in an amount of 200 μL. Referring to a calibration curve formed using a polystyrene standard, Mw and Mn values are induced. As the molecular weight (g/mol) of the polystyrene standard, 9 kinds of 2,000/10,000/30,000/70,000/200,000/700,000/2,000,000/4,000,000/10,000,000 are used.

Preferably, the compound of the average compositional formula of the Chemical Formula 1 can be a compound of the average compositional formula of the following Chemical Formula 4:

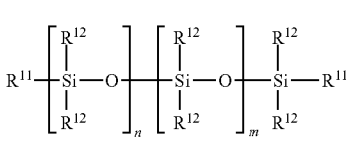

Chemical Formula 4 wherein in Chemical Formula 4:

$R^{11}$ and $R^{12}$ are as defined in Chemical Formula 1; and n and m are numbers respectively selected in the range of 1 to 100, and fulfilling 2 n+m 100.

Preferably, in Chemical Formula 4, n+m is 2 to 100, or 2 to 80, or 2 to 50. A compound fulfilling the range of n+m enables the preparation of a polymerizable composition having excellent processibility.

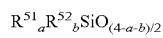

$R^{51}{}_aR^{52}{}_bSiO_{(4-a-b)/2}$

Chemical Formula 5 wherein in Chemical Formula 5:

$R^{51}$ is a substituent of the following Chemical Formula 6;

each $R^{52}$ is independently, hydrogen, an alkyl group, an alkenyl group, an alkynyl group, an alkoxy group, or an aryl group;

a is a number in the range of 0.01 to 0.4; and b is a number in the range of 0.5 to 4;

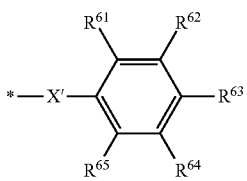

Chemical Formula 6 wherein in Chemical Formula 6:

X' is a group connected to the silicon atom of Chemical Formula 5, and is a single bond, an oxygen atom, a sulfur atom, $-S(=O)_2-$, a carbonyl group, an alkylene group, an alkenylene group, an alkynylene group, $-C(=O)-X^1-$ or $-X^1-C(=O)-$, and $X^1$ is an oxygen atom, a sulfur atom, $-S(=O)_2-$, an alkylene group, an alkenylene group, or an alkynylene group; and each of $R^{61}$ to $R^{65}$ is independently, hydrogen, an alkyl group, an alkoxy group, a hydroxyl group, a cyano group, or a substituent of the following Chemical Formula 7, and at least one of $R^{61}$ to $R^{65}$ is a substituent of the following Chemical Formula 7:

Chemical Formula 7

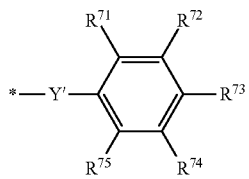

wherein in Chemical Formula 7:

$Y'$ is a single bond, an oxygen atom, a sulfur atom, $—S(=O)_2—$, a carbonyl group, an alkylene group, an alkenylene group, an alkynylene group, $—C(=O)—X^1—$ or $—X^1—C(=O)—$, and $X^1$ is an oxygen atom, a sulfur atom, $—S(=O)_2—$, an alkylene group, an alkenylene group, or an alkynylene group; and each of $R^{71}$ to $R^{75}$ is independently, hydrogen, an alkyl group, an alkoxy group, a hydroxyl group, or a cyano group, and two or more of $R^{71}$ to $R^{75}$ are cyano groups.

The compound of the average compositional formula of Chemical Formula 5 can be a compound in the form of polymer or oligomer, and for example, the weight average molecular weight (Mw) can be in the range of 700 to 7000 g/mol, or 700 to 6500 g/mol, or 700 to 5800 g/mol, or 700 to 5000 g/mol.

The compound of the average compositional formula of Chemical Formula 5 has a weight average molecular weight of the above range, thus enabling the preparation of a polymerizable composition having low process temperature and/or wide process window.

Preferably, the compound of the average compositional formula of Chemical Formula 5 can be a compound of the following Chemical Formula 8:

Chemical Formula 8

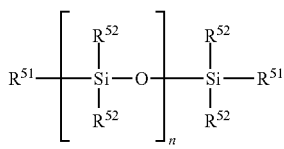

wherein in Chemical Formula 8:

$R^{51}$ and $R^{52}$ are as defined in Chemical Formula 5; and n is a number in the range of 3 to 100.

In Chemical Formula 8, n can be 5 or more, or 7 or more; and 95 or less, or 90 or less, or 85 or less, or 80 or less, or 75 or less, or 70 or less, or 65 or less, or 60 or less.

Preferably, the phthalonitrile compound can be a compound of the following Chemical Formula P1:

Chemical Formula P1

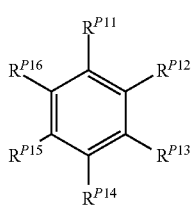

wherein in Chemical Formula P1, each of $R^{P11}$ to $R^{P16}$ is independently, hydrogen, a $C_{1-5}$ alkyl group, $C_{1-5}$ alkoxy group, $C_{6-30}$ aryl group, a group of the following Chemical Formula P2, or a group of the following Chemical Formula P3, and two or more of $R^{P11}$ to $R^{P16}$ are a group of the following Chemical Formula P2 or a group of the following Chemical Formula P3:

Chemical Formula P2

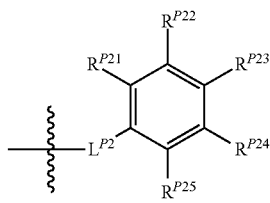

wherein in Chemical Formula P2:

$L^{P2}$ is a direct bond, a $C_{1-5}$ alkylene group, $—O—$, $—S—$, $—C(=O)—$, $—S(=O)—$, or $—S(=O)_2—$;

each of $R^{P21}$ to $R^{P25}$ is independently, hydrogen, a $C_{1-5}$ alkyl group, a $C_{1-5}$ alkoxy group, a $C_{6-30}$ aryl group, or a cyano group; and two or more of $R^{P21}$ to $R^{P25}$ are cyano groups, Chemical Formula P3

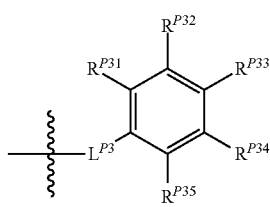

wherein in Chemical Formula P3:

$L^{P3}$ is a direct bond, a $C_{1-5}$ alkylene group, $—O—$, $—S—$, $—C(=O)—$, $—S(=O)—$, $—S(=O)_2—$, $—C(CH_3)_2—$, $—C(CF_3)_2—$, or $—C(=O)NH—$;

each of $R^{P31}$ to $R^{P35}$ is independently, hydrogen, a $C_{1-5}$ alkyl group, a $C_{1-5}$ alkoxy group, a $C_{6-30}$ aryl group, or the group of Chemical Formula P2; and one or more of $R^{P31}$ to $R^{P35}$ are the group of Chemical Formula P2.

Throughout the specification, an "alkyl group" can be a linear or branched chain. Preferably, the alkyl group has a carbon number of 1 to 5 or a carbon number of 1 to 3. Specifically, the alkyl group can be selected from the group consisting of methyl, ethyl, propyl, n-propyl, isopropyl, butyl, n-butyl, isobutyl, tert-butyl, sec-butyl, 1-methyl-butyl, 1-ethyl-butyl, n-pentyl, isopenthyl, neopentyl, and tert-pentyl, and the like.

Throughout the specification, an "aryl group" can be a monocyclic aryl group or a polycyclic aryl group. Preferably, the aryl group has a carbon number of 6 to 30. Specifically, the aryl group can be selected from the group consisting of phenyl, biphenyl, terphenyl, naphthyl, anthracenyl, phenanthryl, pyrenyl, perylenyl, chrysenyl, and fluorenyl, and the like.

Throughout the specification, a "direct bond" means that an atom does not exist in the corresponding group, and the groups of both sides are directly connected to each other.

According to the embodiment of the invention, the phthalonitrile compound can be a compound of the following Chemical Formula P1':

Chemical Formula P1'

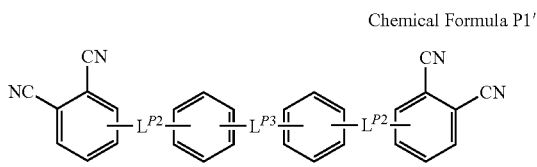

wherein in Chemical Formula P1':

each of $L^{P2}$ and $L^{P3}$ is independently, a direct bond, a $C_{1-5}$ alkylene group, —O—, —S—, —C(=O)—, —S(=O)—, —S(=O)$_2$—, —C(CH$_3$)$_2$—, —C(CF$_3$)$_2$—, or —C(=O)NH—.

As non-limiting examples, a compound of the Chemical Formula P1' wherein each $L^{P2}$ is independently —O—, and $L^{P3}$ is a direct bond or a methylene group can be used as the phthalonitrile compound.

Besides the above explained phthalonitrile compounds, as the examples of the phthalonitrile compound, compounds described in U.S. Pat. Nos. 4,408,035, 5,003,039, 5,003,078, 5,004,801, 5,132,396, 5,139,054, 5,208,318, 5,237,045, 5,292,854, or U.S. Pat. No. 5,350,828, etc. can be included, and besides those described in the documents, various compounds known in the art can be included.

Meanwhile, the curing agent of the phthalonitrile compound is not specifically limited as long as it can react with the phthalonitrile compound to form phthalonitrile resin.

For example, as the curing agent, one or more selected from the group consisting of amine-based compounds, hydroxyl-based compounds and imide-based compounds can be used. The amine-based compound, hydroxyl-based compound and imide-based compound respectively mean a compound comprising at least one amino group, hydroxyl group and imide group in the molecule.

Preferably, the curing agent can be an imide-based compound of the following Chemical Formula 9:

Chemical Formula 9

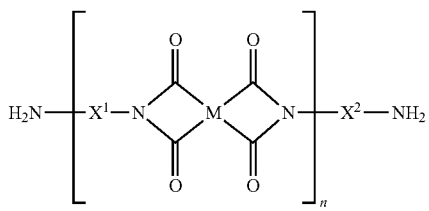

wherein in Chemical Formula 9:

M is a tetravalent radical derived from an aliphatic, alicyclic or aromatic compound;

each of $X^1$ and $X^2$ is independently, an alkylene group, an alkylidene group, or a divalent radical derived from an aromatic compound; and n is a number equal to or greater than 1.

Such an imide-based compound of Chemical Formula 9 exhibits excellent heat resistance because it comprises an imide structure in the molecule, and thus, even if it is included in an excessive amount in the polymerizable composition, or the polymerizable composition is processed or cured at high temperature, a polymerizable composition that does not generate defects such as voids that can have a bad influence on the properties can be prepared.

In Chemical Formula 9, M can be a tetravalent radical derived from an aliphatic, alicyclic or aromatic compound, and it can have a structure wherein radicals formed by dehydrogenation of 4 hydrogen atoms in the molecule of the aliphatic, alicyclic or aromatic compound are respectively connected with the carbon atoms of the carbonyl group of Chemical Formula 9.

Specifically, as the aliphatic compound, linear or branched alkane, alkene or alkyne can be included. As the aliphatic compound, C2-20, C2-16, C2-12, C2-8 or C2-4 alkane, alkene, or alkyne can be used. The alkane, alkene, or alkyne can be optionally substituted with one or more substituents.

As the alicyclic compound, hydrocarbon compounds comprising C3-20, C3-16, C3-12, C3-8 or C3-4 nonaromatic ring structures can be included. Such an alicyclic hydrocarbon compound can comprise at least one hetero atom such as oxygen or nitrogen as a ring member, and if necessary, it can be optionally substituted with one or more substituents.

And, as the aromatic compound, benzene, benzene-containing compounds or derivatives thereof can be included. The benzene-containing compound means a compound wherein two or more benzene rings are condensed while sharing one or two or more carbon atoms, or directly connected, or connected by an appropriate linker.

As the linker used to connect two benzene rings, an alkylene group, an alkylidene group, —O—, —S—, —C(=O)—, —S(=O)—, —S(=O)$_2$—, —C(=O)—O-$L^1$-O—C(=O)—, -$L^2$-C(=O)—O-$L^3$-, -$L^4$-O—C(=O)-$L^5$-, or -$L^6$-Ar$^1$-$L^7$-Ar$^2$-$L^8$-, etc. can be included.

Each of $L^1$ to $L^8$ can be independently, a single bond, —O—, an alkylene group, or an alkylidene group, and each of Ar$^1$ and Ar$^2$ can be independently, an arylene group.

The aromatic compound can comprise, for example, 6 to 30, 6 to 28, 6 to 27, 6 to 25, 6 to 20 or 6 to 12 carbon atoms, and if necessary, can be substituted with one or more substituents. In case the aromatic compound comprises the above described linker, the number of carbon atoms of the aromatic compound is a number including the carbon atom existing in the linker.

Specifically, for example, in Chemical Formula 9, M can be a tetravalent radical derived from alkane, alkene, or alkyne, or a tetravalent radical derived from the compound of any one of the following Chemical Formulas 10 to 15:

Chemical Formula 10

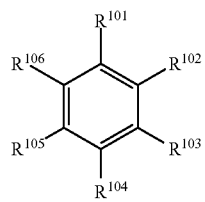

wherein in Chemical Formula 10, each of $R^{101}$ to $R^{106}$ is independently, hydrogen, an alkyl group, an alkoxy group, or an aryl group;

Chemical Formula 11

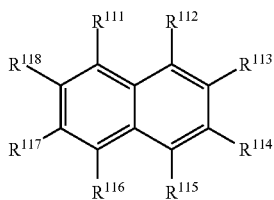

wherein in Chemical Formula 11, each of $R^{111}$ to $R^{118}$ is independently, hydrogen, an alkyl group, an alkoxy group, or an aryl group;

Chemical Formula 12

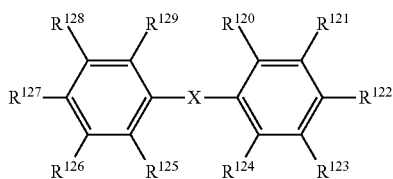

wherein in Chemical Formula 12:
each of $R^{120}$ to $R^{129}$ is independently, hydrogen, an alkyl group, an alkoxy group, or an aryl group;
X is a single bond, an alkylene group, an alkylidene group, —O—, —S—, —C(=O)—, —S(=O)—, —S(=O)$_2$—, —C(=O)—O-L$^1$-O—C(=O)—, -L$^2$-C(=O)—O-L$^3$-, -L$^4$-O—C(=O)-L$^5$-, or -L$^6$-Ar$^1$-L$^7$-Ar$^2$-L$^8$-;
each of L$^1$ to L$^8$ is independently, a single bond, —O—, an alkylene group, or an alkylidene group; and
each of Ar$^1$ and Ar$^2$ is independently, an arylene group.

Here, the single bond means that any atom does not exist at that part. Thus, in the Chemical Formula 12, if X is a single bond, it means that any atom does not exist at a part indicated by X, and in this case, the benzene rings of both sides of X can be directly connected to form a biphenyl structure.

Among the X in the Chemical Formula 12, in —C(=O)—O-L$^1$-O—C(=O)—, -L$^2$-C(=O)—O-L$^3$-, or -L$^4$-O—C(=O)-L$^5$-, each of L$^1$ to L$^5$ can be independently, a C1-12, C1-8, or C1-4 alkylene group or alkylidene group, and the alkylene group or alkylidene group can be substituted or unsubstituted.

And, among the X in Chemical Formula 12, in -L$^6$-Ar$^1$-L$^7$-Ar$^2$-L$^8$-, L$^6$ and L$^8$ can be —O—, L$^7$ can be a C1-12, C1-8, or C1-4 alkylene group or alkylidene group, and the alkylene group or alkylidene group can be substituted or unsubstituted. Ar$^1$ and Ar$^2$ can be a phenylene group, and in this case, on the basis of L$^7$, each of L$^6$ and L$^8$ can be connected at the ortho, meta or para position of the phenylene.

Chemical Formula 13

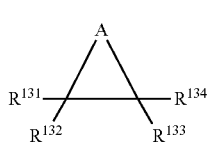

wherein in Chemical Formula 13:
each of $R^{131}$ to $R^{134}$ is independently, hydrogen, an alkyl group, or an alkoxy group, and two of $R^{131}$ to $R^{134}$ can be connected to each other to form an alkylene group; and A is an alkylene group or an alkenylene group, and the alkylene group or alkenylene group of A can comprise one or more oxygen atoms as a hetero atom;

Chemical Formula 14

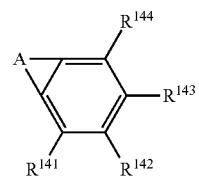

wherein in Chemical Formula 14:
each of $R^{141}$ to $R^{144}$ is independently, hydrogen, an alkyl group, or an alkoxy group; and
A is an alkylene group;

Chemical Formula 15

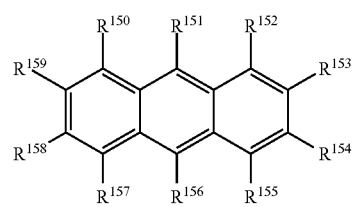

wherein in Chemical Formula 15:
each of $R^{150}$ to $R^{159}$ is independently, hydrogen, an alkyl group, or an alkoxy group.

The tetravalent radical derived from the compound of any one of Chemical Formulas 10 to 15 can be formed by direct removal of the substituents of the Chemical Formula 10 to 15, or can be formed by dehydrogenation of the hydrogen atom of the alkyl group, alkoxy group, aryl group, alkylene group, or alkenylene group in the substituents.

For example, in case the tetravalent radical is derived from the compound of Chemical Formula 10, one or more, two or more, three or more, or four of $R^{101}$ to $R^{106}$ of Chemical Formula 10 can form a radical, or hydrogen atoms of the alkyl group, alkoxy group or aryl group existing in $R^{101}$ to $R^{106}$ can leave to form a radical. The formation of a radical means that the part is connected to the carbon atom of the carbonyl group of the Chemical Formula 9, as explained above.

And, in case the tetravalent radical is derived from the compound of Chemical Formula 12, each of $R^{120}$ to $R^{129}$ is independently, hydrogen, an alkyl group, an alkoxy group, or an aryl group, and one or more, two or more, three or more or four of $R^{120}$ to $R^{129}$ can form a radical connected to the Chemical Formula 9. Each of $R^{120}$ to $R^{129}$ that does not form a radical can be hydrogen, an alkyl group or an alkoxy group, or can be hydrogen or an alkyl group. For example, in Chemical Formula 12, two of $R^{127}$ to $R^{129}$ and two of $R^{122}$ to $R^{124}$ can form the radical, and other substituents can be independently, hydrogen, an alkyl group, an alkoxy group, or an aryl group, or can be hydrogen, an alkyl group or an alkoxy group, or can be hydrogen or an alkyl group.

As non-limiting examples, the compound of Chemical Formula 10 can be benzene or 1,2,4,5-tetraalkylbenzene.

As non-limiting examples, the compound of Chemical Formula 12 can be biphenyl, or a compound of any one of the following Chemical Formulas A to F:

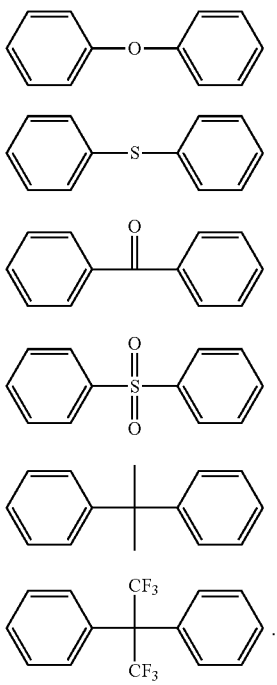

Chemical Formula A

Chemical Formula B

Chemical Formula C

Chemical Formula D

Chemical Formula E

Chemical Formula F

And, the compound of Chemical Formula 13 can be C4-8 cycloalkane such as cyclohexane, etc., C4-8 cycloalkene such as cyclohexene that can be substituted with one or more alkyl groups, etc., or a compound of any one of the following Chemical Formulas G to I:

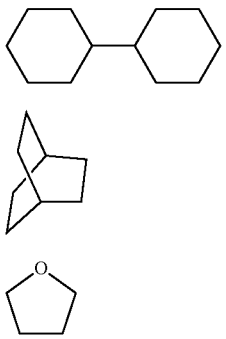

Chemical Formula G

Chemical Formula H

Chemical Formula I

And, the compound of Chemical Formula 14 can be a compound of the following Chemical Formula J, or a compound of the following Chemical Formula J, at least one hydrogen of which is substituted with an alkyl group:

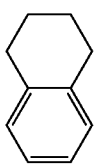

Chemical Formula J

In Chemical Formula 9, each of $X^1$ and $X^2$ can be independently, a divalent radical derived from an aromatic compound. For example, each of $X^1$ and $X^2$ can be independently, a divalent radical derived from a C6-40 aromatic compound. The divalent radical derived from an aromatic compound can be as explained above.

Specifically, in Chemical Formula 9, each of $X^1$ and $X^2$ can be independently, a divalent radical derived from a compound of any one of the following Chemical Formulas 16 to 18:

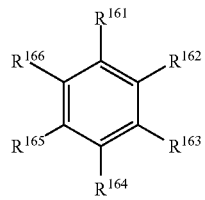

Chemical Formula 16 wherein in Chemical Formula 16:
each of $R^{161}$ to $R^{166}$ is independently, hydrogen, an alkyl group, an alkoxy group, an aryl group, a hydroxy group, or a carboxyl group;

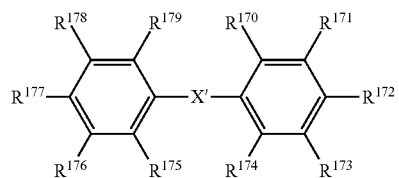

Chemical Formula 17 wherein in Chemical Formula 17:
each of $R^{170}$ to $R^{179}$ is independently, hydrogen, an alkyl group, an alkoxy group, an aryl group, a hydroxy group, or a carboxyl group;
X' is a single bond, an alkylene group, an alkylidene group, —O—, —S—, —C(=O)—, —NR$^a$—, —S(=O)—, —S(=O)$_2$—, -L$^9$-Ar$^3$-L$^{10}$- or -L$^{11}$-Ar$^4$-L$^{12}$-Ar$^5$-L$^{13}$-;
$R^a$ is hydrogen, an alkyl group, an alkoxy group, or an aryl group;
each of $L^9$ to $L^{13}$ is independently, a single bond, —O—, an alkylene group, or an alkylidene group; and
each of $Ar^3$ to $Ar^5$ is independently, an arylene group;

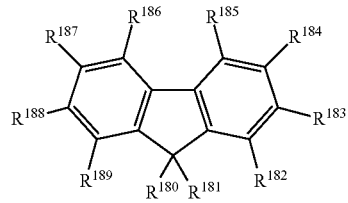

Chemical Formula 18 wherein in Chemical Formula 18:
each of $R^{180}$ to $R^{189}$ is independently, hydrogen, an alkyl group, an alkoxy group, an aryl group, a hydroxy group, or a carboxyl group.

The divalent radical derived from the compound of any one of Chemical Formulas 16 to 18 can be formed by direct removal of the substituents of Chemical Formulas 16 to 18, or can be formed by dehydrogenation of the hydrogen atom of the alkyl group, alkoxy group, aryl group, alkylene group, or alkenylene group in the examples of the substituents.

For example, in case the divalent radical is derived from the compound of Chemical Formula 16, for example, phenylene, the substitution position of the amine group on the basis of a part connected to N at $X^1$ of Chemical Formula 9 can be ortho, meta or para, and the substitution position of the amine group on the basis of a part connected to N at $X^2$ of Chemical Formula 9 can be also ortho, meta or para.

And, in case the divalent radical is derived from the compound of Chemical Formula 17, one of $R^{177}$ to $R^{179}$ of Chemical Formula 17 and one of $R^{172}$ to $R^{174}$ of Chemical Formula 17 can form a radical connected to the nitrogen atom of Chemical Formula 9. Other substituents excluding the substituents forming radicals can be independently, hydrogen, an alkyl group, an alkoxy group or an aryl group, or hydrogen, an alkyl group or an alkoxy group, or hydrogen or an alkyl group.

As non-limiting examples, the compound of Chemical Formula 16 can be benzene that can be substituted with at least one hydroxyl group or carboxyl group.

And, the compound of Chemical Formula 17 can be biphenyl that can be substituted with at least one hydroxyl group or carboxyl group, a compound of any one of Chemical Formulas A to F, which can be substituted with at least one hydroxyl group or carboxyl group, or a compound of the following Chemical Formula K or M, which can be substituted with at least one hydroxyl group or carboxyl group:

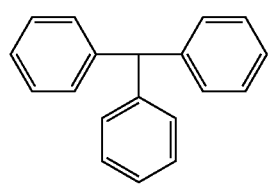

Chemical Formula K

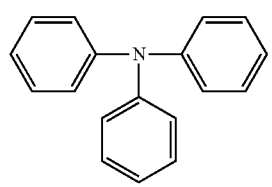

Chemical Formula L

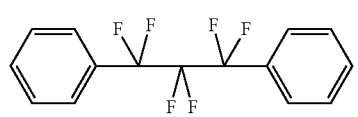

Chemical Formula M

And, the compound of Chemical Formula 18 can be a compound of the following Chemical Formula N, or a compound of the following Chemical Formula N, at least one hydrogen of which is substituted with a hydroxyl group or a carboxyl group:

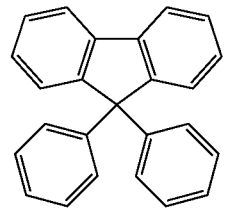

Chemical Formula N

Throughout the specification, the alkyl group can be a C1-20, C1-16, C1-12, C1-8, or C1-4 alkyl group, unless otherwise described. The alkyl group can be linear, branched or cyclic, and if necessary, can be substituted with one or more substituents.

The alkoxy group can be a C1-20, C1-16, C1-12, C1-8, or C1-4 alkoxy group, unless otherwise described. The alkoxy group can be linear, branched or cyclic, and if necessary, can be substituted with one or more substituents.

The aryl group means a monovalent residue derived from the above described aromatic compound, unless otherwise described.

The alkylene group and alkylidene group can be a C1-20, C1-16, C1-12, C1-8, or C1-4 alkylene group and alkylidene group, unless otherwise described. The alkylene group and alkylidene group can be linear, branched or cyclic, and if necessary, can be optionally substituted with one or more substituents.

Throughout the specification, as the substituent with which the aliphatic compound, alicyclic compound, aromatic compound, alkyl group, alkoxy group, aryl group, alkylene group, or alkylidene group, etc. can be optionally substituted, halogen such as chlorine or fluorine, etc., an epoxy group such as a glycidyl group, an epoxyalkyl group, a glycidoxyalkyl group, or alicyclic epoxy group, etc., an acryloyl group, a methacryloyl group, an isocyanate group, a thiol group, an alkyl group, an alkoxy group, or an aryl group, etc. can be included, but not limited thereto.

And, in Chemical Formula 9, n means the number of imide repeat units, and it can be a number in the range of 2 to 200, 2 to 150, 2 to 100, 2 to 90, 2 to 80, 2 to 70, 2 to 60, 2 to 50, 2 to 40, 2 to 30, 2 to 20, or 2 to 10.

If n in Chemical Formula 9 is 2 or more, namely, if the compound of Chemical Formula 9 is a polyimide-based compound, it can be more advantageous in terms of heat resistance and strength. Thus, relative friction component material comprising phthalonitrile resin cured using a polyimide-based compound has higher heat resistance, thus preventing modification and fusion of the phthalonitrile resin under high velocity high pressure conditions, and due to higher strength, can exhibit low abrasion and high durability.

As non-limiting examples, the curing agent can be a compound of the following Chemical Formula C1 or the following Chemical Formula C2:

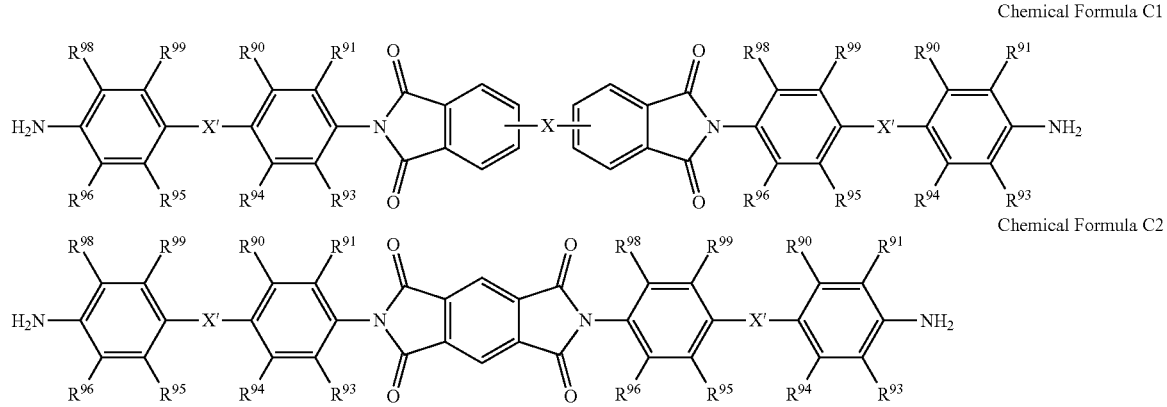

Chemical Formula C1

Chemical Formula C2 wherein in Chemical Formulas C1 and C2:
each of X and X' is independently, a direct bond, a $C_{1-5}$ alkylene group, —O—, —S—, —C(=O)—, —S(=O)—, —S(=O)$_2$—, —C(=O)—O-L$^1$-O—C(=O)—, -L$^2$-C(=O)—O-L$^3$-, -L$^4$-O—C(=O)-L$^5$-, or -L$^6$-Ar$^1$-L$^7$-Ar$^2$-L$^8$-;
each of L$^1$ to L$^8$ is independently, a direct bond, —O—, or a $C_{1-5}$ alkylene group;
each of Ar$^1$ and Ar$^2$ is independently, a $C_{6-30}$ arylene group; and
each of R$^{90}$ to R$^{99}$ is independently, hydrogen, a $C_{1-5}$ alkyl group, a $C_{1-5}$ alkoxy group, a $C_{6-30}$ aryl group, a hydroxy group, or a carboxyl group.

Meanwhile, the compound of Chemical Formula 9 can be synthesized by any known synthesis method of organic compounds, and the specific method is not specifically limited. For example, the compound of Chemical Formula 9 can be formed by dehydration condensation of a dianhydride compound and a diamine compound, etc.

And, the compound of Chemical Formula 9 is not volatized or decomposed at high temperature due to high boiling point, and thus, the curability of a polymerizable composition is stably maintained, and void that can have a bad influence on the properties is not formed during a high temperature processing or curing process. Thus, for example, the compound can have a decomposition temperature of 300° C. or more, 350° C. or more, 400° C. or more, or 500° C. or more. The decomposition temperature means a temperature at which the decomposition rate of the compound of Chemical Formula 9 is maintained in the range of 10% or less, 5% or less or 1% or less. The upper limit of the decomposition temperature is not specifically limited, but for example, it can be about 1,000° C. or less.

And, the compound of Chemical Formula 9 can easily control the reactivity or process window of the polymerizable composition itself, namely, a difference between the melting temperature and curing temperature of the polymerizable composition or prepolymer formed therefrom, by the selection of the core M or linker X$^1$ or X$^2$, and thus, act as a curing agent having various properties according to use.

(2) Filler
In the low friction resin composite, a filler dispersed in the binder is included as additives.

The filler is dispersed in the binder to reduce the erosion of a facing side and exhibit abrasion resistance in an ultra high pressure and ultra high velocity environment.

Preferably, three or more kinds of fillers are used in the low friction resin composite, thereby securing appropriate abrasion resistance and low friction coefficient.

In order to exhibit the above explained properties, it is preferable that three or more additives selected from the group consisting of graphite, polytetrafluoroethylene (PTFE), tungsten disulfide ($WS_2$), molybdenum disulfide ($MoS_2$), and milled carbon fiber (mCF) are used as the filler.

More preferably, it is advantageous for the above explained properties that as the filler, graphite is included; and two or more additives selected from the group consisting of polytetrafluoroethylene, tungsten disulfide, molybdenum disulfide, and milled carbon fiber are further included.

The graphite can be preferably used because it has relatively low density and cost among the above illustrated fillers, and simultaneously, can realize excellent low friction property and appropriate abrasion resistance.

As non-limiting examples, in the low friction resin composite, as the filler,
graphite, polytetrafluoroethylene, and tungsten disulfide; or
graphite, polytetrafluoroethylene, and molybdenum disulfide; or
graphite, polytetrafluoroethylene, and milled carbon fiber; or
graphite, tungsten disulfide, and molybdenum disulfide; or
graphite, tungsten disulfide, and milled carbon fiber; or
graphite, molybdenum disulfide, and milled carbon fiber; or
graphite, polytetrafluoroethylene, tungsten disulfide, and molybdenum disulfide; or
graphite, polytetrafluoroethylene, tungsten disulfide, and milled carbon fiber; or
graphite, polytetrafluoroethylene, molybdenum disulfide, and milled carbon fiber; or
graphite, tungsten disulfide, molybdenum disulfide, and milled carbon fiber; or
graphite, polytetrafluoroethylene, tungsten disulfide, molybdenum disulfide, and milled carbon fiber; can be included.

As necessary, the low friction resin composite can further comprise one or more particles selected from the group consisting of glass fiber, titanium oxide, antimony trisulfide, antimony trioxide, barium sulfate, calcium hydroxide, calcium carbonate, magnesium oxide, calcium fluoride, silica, alumina, iron oxide, chromium oxide, zirconium oxide, boron nitride, carbon nanotube, carbon fiber, and graphene, in addition to the above illustrated fillers.

It is preferable that the filler is powder additive consisting of the above explained materials and having a longest diameter of 0.01 to 100 μm. Wherein, in case fine particle making up the powder is spherical, the longest diameter means the diameter of the fine particle. In case fine particle making up the powder is not spherical, the longest diameter means the longest diameter at the central cutting plane of the fine particle.

The particle diameter of the fine particles can be measured using particle size analyzer (representatively, acquirable from HORIBA Company, etc.) according to ASTM E 799-03 (Standard Practice for Determining Data Criteria and Processing for Liquid Drop Size Analysis).

If the size of the fine particles making up the powder is too small, they can be easily aggregated when preparing the low friction resin composite, and thus, it can be difficult to realize uniform properties. And, if the size of the fine particles is too small, the number of internal layers of particles capable of lubricating can be reduced, and thus, may not completely perform a function as a lubricant.

In case the size of the fine particles making up the powder is too large, it can be difficult to uniformly disperse the filler when preparing a low friction resin composite, and thus, it can be difficult to realize aimed low friction property.

The filler can be present in an amount of 1 to 100 parts by weight, based on 100 parts by weight of the binder comprising phthalonitrile-based resin.

Specifically, based on 100 parts by weight of the binder, the filler can be present in an amount of 1 parts by weight or more, or 5 parts by weight or more, or 10 parts by weight or more, or 20 parts by weight or more, or 30 parts by weight or more, or 40 parts by weight or more; and 100 parts by weight or less, or 90 parts by weight or less, or 80 parts by weight or less, or 70 parts by weight or less, or 60 parts by weight or less, or 50 parts by weight or less.

Preferably, based on 100 parts by weight of the binder, the filler can be present in an amount of 1 to 100 parts by weight, or 5 to 100 parts by weight, or 5 to 90 parts by weight, or 10 to 90 parts by weight, or 10 to 80 parts by weight, or 15 to 80 parts by weight, or 20 to 80 parts by weight, or 20 to 70 parts by weight, or 30 to 70 parts by weight, or 30 to 60 parts by weight, or 40 to 60 parts by weight.

If the content of the filler is too low, the low friction resin composite may not have sufficiently low friction coefficient and appropriate abrasion resistance. And, if the content of the filler is too high, sufficient strength may not be provided to the low friction resin composite, and thus, it can be destructed under high speed and high pressure conditions or by impact.

For one example, the low friction resin composite can comprise, based on 100 parts by weight of the binder comprising phthalonitrile-based resin, 15 to 30 parts by weight of graphite, and 10 to 40 parts by weight of two additives selected from the group consisting of polytetrafluoroethylene, tungsten disulfide, molybdenum disulfide, and milled carbon fiber.

For another example, the low friction resin composite can comprise, based on 100 parts by weight of the binder comprising phthalonitrile-based resin, 20 to 25 parts by weight of graphite, and 15 to 35 parts by weight of two additives selected from the group consisting of polytetrafluoroethylene, tungsten disulfide, molybdenum disulfide, and milled carbon fiber.

(3) The Properties of the Low Friction Resin Composite

In order to confirm whether or not the above explained low friction resin composite exhibits low friction property, a friction coefficient can be measured according to ASTM D3702 (Standard Test Method for Wear Rate and Coefficient of Friction of Materials in Self-lubricating Rubbing Contact Using a Thrust Washer Testing Machine).

Particularly, as confirmed in Examples below, the low friction resin composite exhibits low friction coefficient even under high pressure and high rotation velocity condition against friction subject materials, and thus, can be applied as relative friction component material of automobiles.

Here, the ASTM D3702 standard measures a friction coefficient and a wear-rate of a thrust washer test specimen so as to confirm whether it is appropriate for use as self-lubricating material.

In the present invention, the friction coefficient and wear-rate according to ASTM D3702 were measured using the friction coefficient measuring apparatus as shown in FIG. 1.

Specifically, a method of calculating a friction coefficient and a wear-rate according to ASTM D3702 standard is as follows:

1) The low friction resin composite is prepared into a test specimen having a size and thickness prescribed in ASTM D3702.
2) In the upper rotary specimen holder of the friction coefficient measuring apparatus, the prepared test specimen is installed.
3) In the lower stationary specimen holder of the friction coefficient measuring apparatus, friction subject material is installed (in FIG. 1, steel washer is installed as subject material)
4) Specific pressure (P) and rotation velocity (V) are set in the friction coefficient measuring apparatus, and a friction coefficient (f) under desired PV value (the product of pressure and velocity) can be calculated according to the following Equation 1:

$$f = T/rW \qquad \text{Equation 1}$$

wherein in Equation 1:

T is Torque (N·m) applied to the test specimen, r is the radius (mm) of the test specimen, and W is a vertical force (kg).

And, a wear-rate can be calculated as follows: A weight change before/after an experiment is measured and divided by a density, thus obtaining a worn volume, the obtained volume change is divided by the area of a ring to obtain a decreased thickness, and based thereon, a wear-rate is calculated as a thickness decreased per second ($10^{-10}$ m/s).

The low friction resin composite may not generate thermal deformation, when measuring a friction coefficient of a thrust washer test specimen having a contact area of 1.3 $cm^2$ against carbon steel subject material under PV Value of 2.3 MPa·m/s, according to ASTM D3702. Namely, the low friction resin composite according to one embodiment can withstand a velocity and a pressure under non-lubricated environment with a PV Value of 2.3 MPa·m/s.

Specifically, the low friction resin composite can have a friction coefficient under non-lubricated (self-lubricating) condition of 0.175 or less, measured for a thrust washer test specimen having a contact area of 1.3 $cm^2$ against carbon steel subject material under PV Value of 2.3 MPa·m/s, according to ASTM D3702.

Specifically, the friction coefficient under non-lubricated (self-lubricating) condition can be 0.175 or less, or 0.170 or less, or 0.165 or less. Preferably, the friction coefficient can be 0.050 to 0.175, or 0.055 to 0.175, or 0.055 to 0.170, or 0.060 to 0.170, or 0.060 to 0.165, or 0.065 to 0.165, or 0.070 to 0.165, or 0.075 to 0.165, or 0.080 to 0.165, or 0.085 to 0.165.

The low friction resin composite can have a lower friction coefficient under lubricated condition applying common lubricant. Wherein, the kind and application method of the lubricant are not specifically limited.

Specifically, the low friction resin composite can have a friction coefficient under lubricated (lubricant: automobile lubricating oil) condition of 0.060 or less, measured for a thrust washer test specimen having a contact area of 1.3 cm$^2$ against carbon steel subject material under PV Value of 4.6 MPa·m/s, according to ASTM D3702.

Specifically, the friction coefficient under lubricated condition can be 0.060 or less, or 0.057 or less, or 0.055 or less. Preferably, the friction coefficient can be 0.035 to 0.060, or 0.040 to 0.060, or 0.040 to 0.057, or 0.045 to 0.057, or 0.045 to 0.055.

Here, the PV Value of 2.3 MPa·m/s can be realized by the pressure (P) of 1.63 MPa and the rotation velocity (V) of 1.41 m/s, and the PV Value of 4.6 MPa·m/s can be realized by the pressure (P) of 1.63 MPa and the rotation velocity (V) of 2.82 m/s.

Meanwhile, the low friction resin composite can have a process temperature in the range of 150° C. to 350° C.

The process temperature means a temperature at which the low friction resin composite exists in a processible state. Such a process temperature can be, for example, a melting temperature (Tm) or glass transition temperature (Tg).

In this case, the process wind of the polymerizable composition, i.e., the absolute value of a difference (Tc−Tp) between the process temperature (Tp) and the curing temperature (Tc) of the phthalonitrile compound and curing agent, can be 30° C. or more, 50° C. or more, or 100° C. or more. For example, the curing temperature (Tc) can be higher than the process temperature (Tp). Such a range can be advantageous for securing appropriate processibility during the process of preparing relative friction component material described below. The upper limit of the process window is not specifically limited, but for example, the absolute value of a difference (Tc−Tp) between the process temperature (Tp) and the curing temperature (Tc) can be 400° C. or less, or 300° C. or less.

Meanwhile, the low friction resin composite can be provided in a prepolymer state.

The prepolymer state means a state wherein the reaction of the phthalonitrile compound and curing agent constituting the binder has occurred to some degree (for example, the polymerization of A or B stage occurred), but a complete polymerized state is not reached, and it exhibits appropriate flowability, and thus, can be processed.

As non-limiting examples, the prepolymer state can mean a state wherein the melting viscosity measured in the range of about 150° C. to 250° C. is 10 Pa·s to 100,000 Pa·s, 10 Pa·s to 10,000 Pa·s, or 10 Pa·s to 5,000 Pa·s.

For example, the process temperature of the prepolymer can be 150° C. to 350° C. The process temperature means a temperature at which the prepolymer exists in a processible state.

II. Relative Friction Component Material

According to another embodiment of the invention, relative friction component material prepared using the low friction resin composite is provided.

As explained above, the low friction resin composite can provide relative friction component material having durability and low friction property even under very high pressure and very high speed environment.

As the relative friction component material, a bearing, a bushing, a thrust washer, an oil seal, a piston ring, a sliding, or a roller, and the like can be included. The relative friction component can be applied for an automobile, aircraft, or other industrial materials, and the like.

The relative friction component material can be prepared by molding the prepolymer of the low friction resin composite into an aimed shape by heating, and then, curing. The processing and curing method for preparing the relative friction component can be conducted according to a known method.

Advantageous Effects

The low friction resin composite according to the present invention has low friction property as well as excellent heat resistance, and thus, can prepare relative friction component material having excellent durability and low friction property.

DETAILED DESCRIPTION OF THE EMBODIMENTS

Hereinafter, preferable examples are presented for better understanding of the present invention. However, these examples are presented only as the illustrations of the present invention, and the scope of the present invention is not limited thereby.

$^1$H-NMR (Nuclear Magnetic Resonance) Analysis

The NMR analysis for the compounds prepared below was conducted according to the manual of the manufacturing company using 500 MHz NMR equipment of Agilent Inc. The sample for NMR measurement was prepared by dissolving the compound in DMSO(dimethyl sulfoxide)-d6.

Preparation Example 1. Synthesis of a Phthalonitrile Compound (PN1)

The compound of the following Chemical Formula A1 (PN1) was synthesized as follows.

Figure 1:
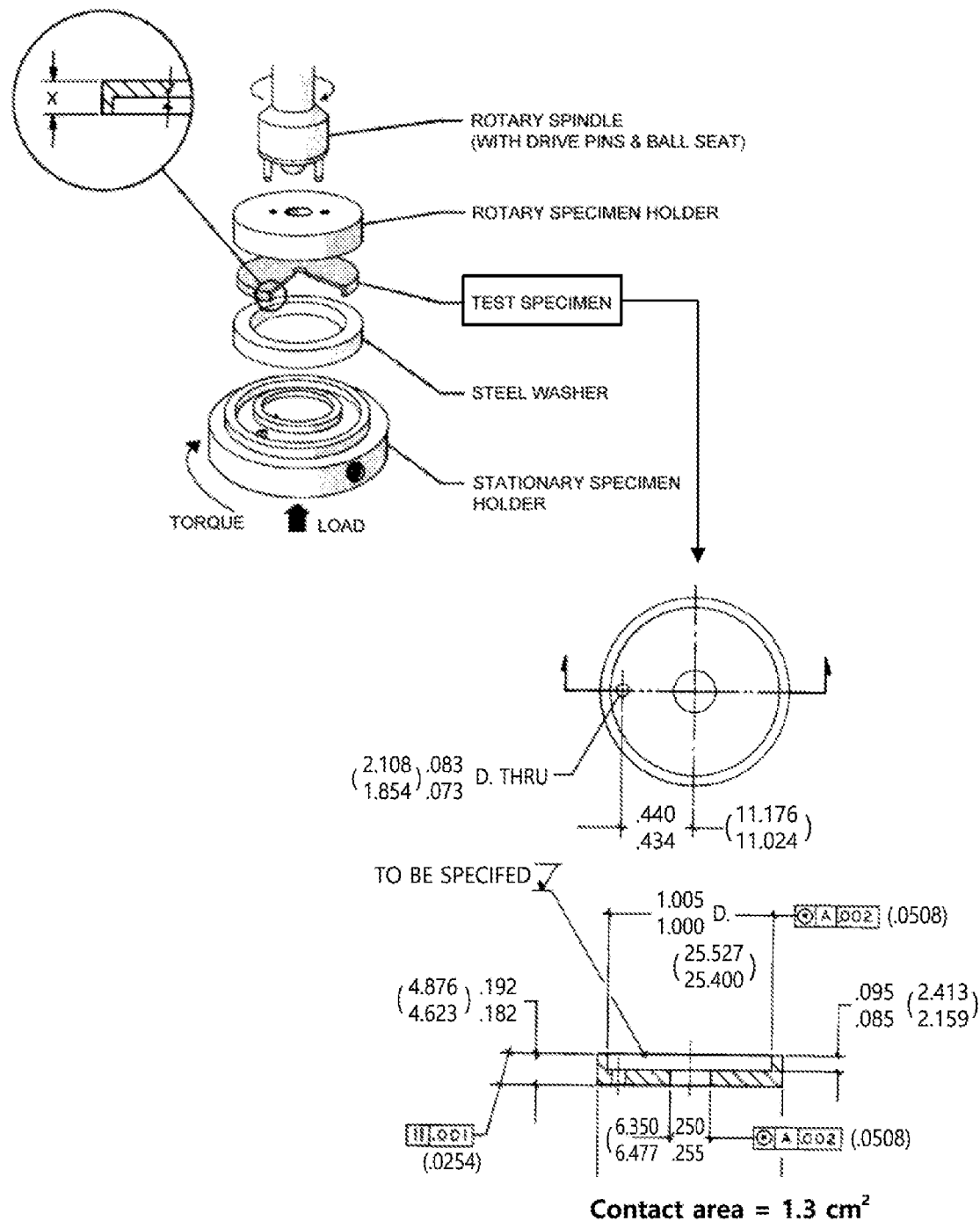
FIG. 1 is an exploded perspective view of the friction coefficient measuring apparatus for measuring a friction coefficient according to ASTM D3702.
Figure 2:
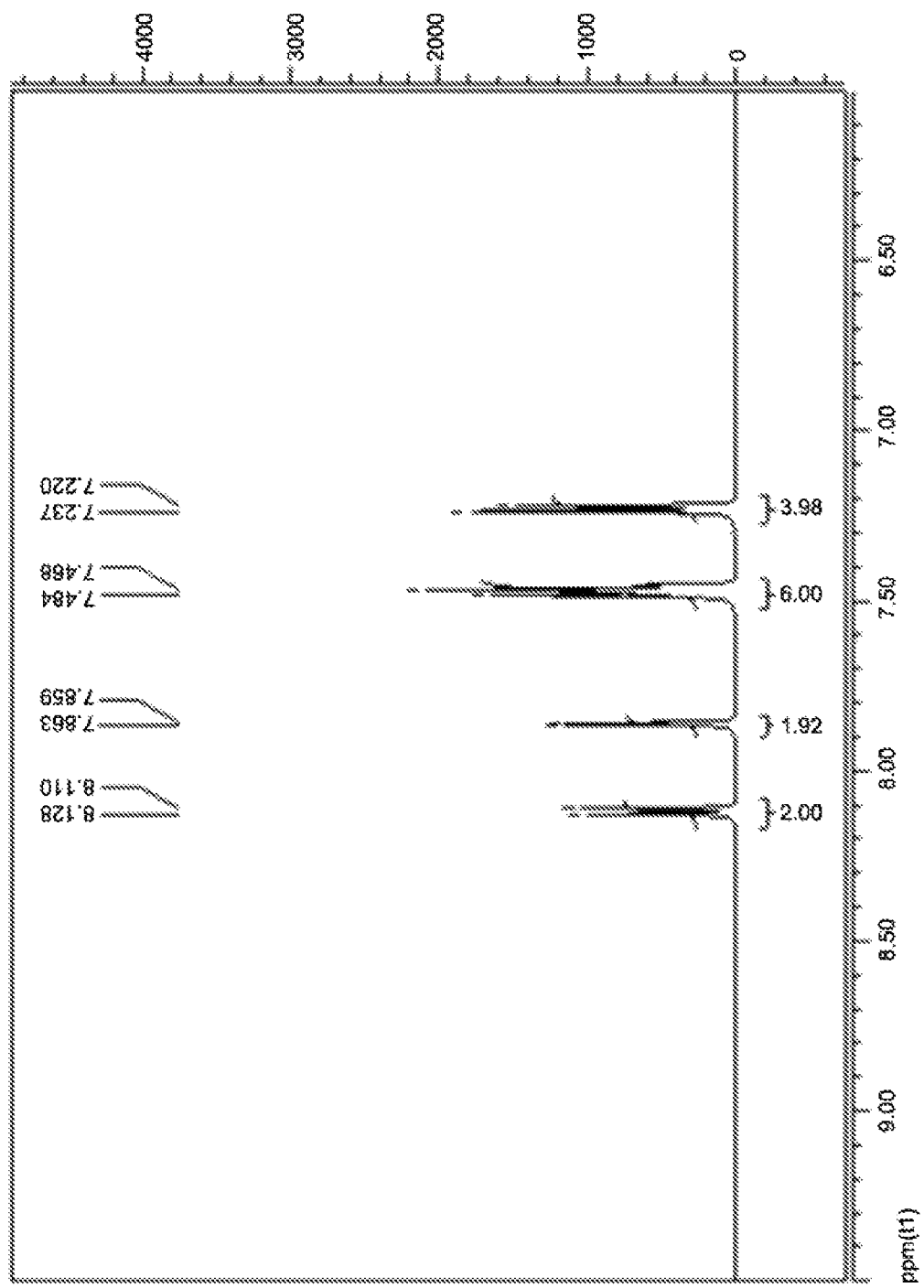
FIGS. 2 to 4 show the $^1$H-NMR data of the compounds prepared in Preparation Examples 1 to 3, respectively.

32.7 g of the compound of the following Chemical Formula A2 and 120 g of DMF (Dimethyl Formamide) were introduced into a 3 neck round bottom flask, and stirred at room temperature to dissolve. Subsequently, 51.9 g of the compound of the following Chemical Formula A3 was added, and 50 g of DMF was added, and then, stirred to dissolve. Subsequently, 62.2 g of potassium carbonate and 50 g of DMF were introduced together, and the temperature was raised to 85° C. while stirring. After reacting for about 5 hours, the solution was cooled to room temperature. The cooled reaction solution was poured into the aqueous solution of 0.2 N hydrochloric acid to neutralize and precipitate, and after filtering, washed with water. Thereafter, the filtered reactant was dried in a vacuum oven of 100° C. for a day, water and remaining solvents were removed, and then, the compound of the following Chemical Formula A1 (PN1) was obtained with the yield of about 80 wt %. The $^1$H-NMR analysis result for the obtained compound of Chemical Formula A1 (PN1) is shown in FIG. 2.

Chemical Formula A1

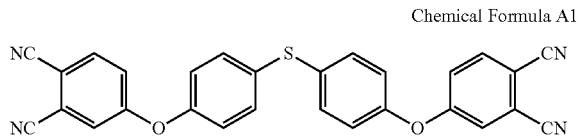

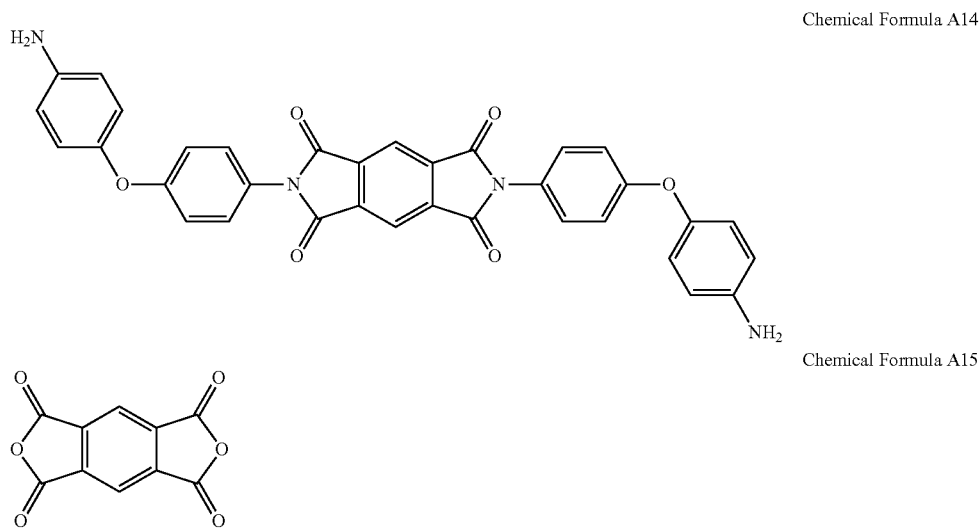

Chemical Formula A14

Chemical Formula A15

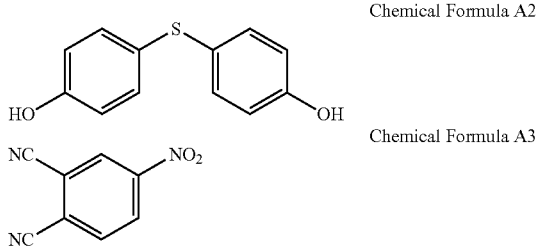

-continued

Chemical Formula A2

Chemical Formula A3

Preparation Example 2. Synthesis of a Curing Agent Compound (CA1)

Figure 3:
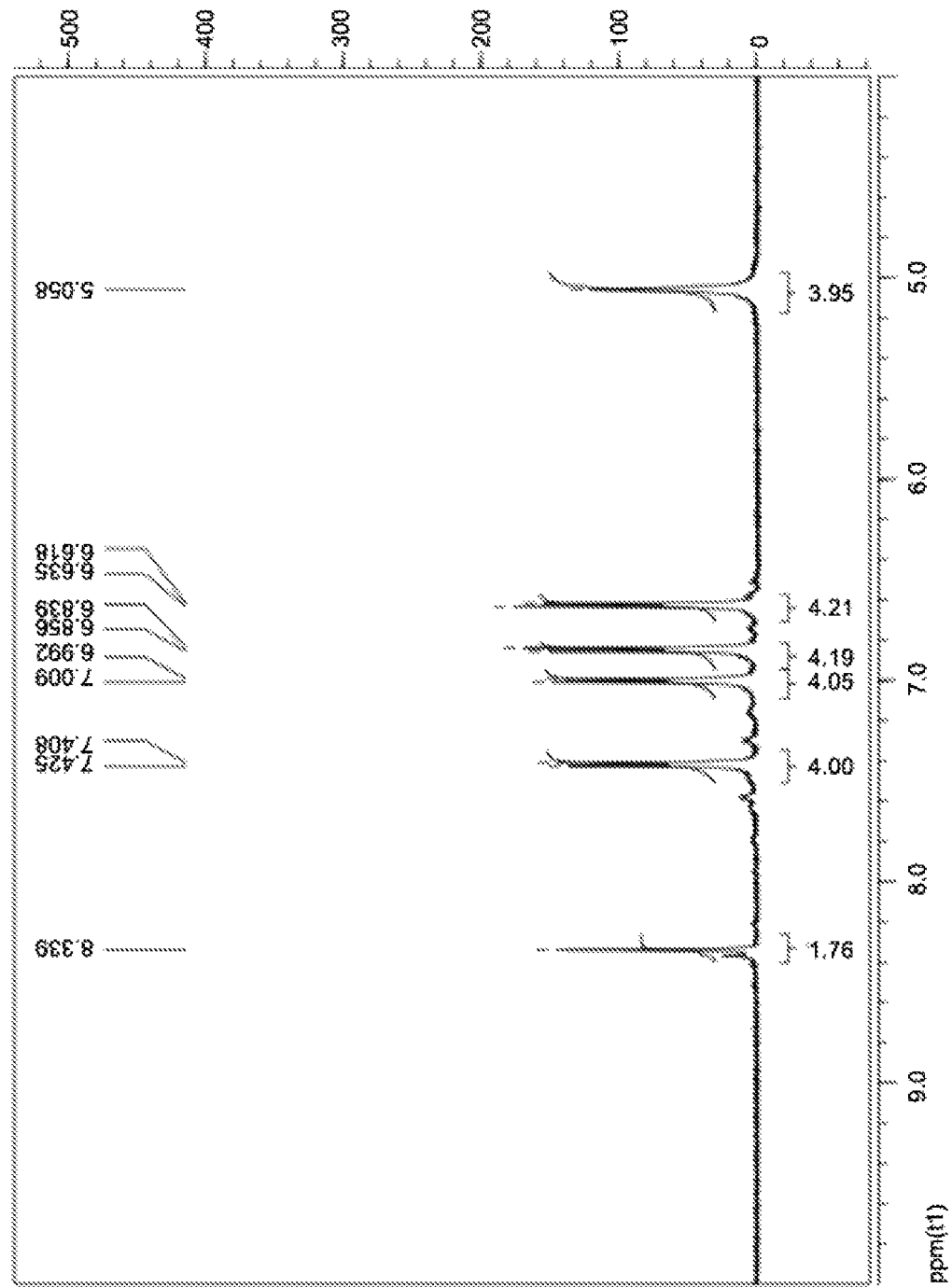

A compound of the following Chemical Formula A14 (CA1) was synthesized by dehydrogenation condensation of diamine and dianhydride. 24 g of 4,4'-oxydianiline and 40 g of NMP (N-methyl-pyrrolidone) were introduced into a 3 neck round bottom flask, and stirred at room temperature to dissolve. The solution was cooled with a water bath, and 8.7 g of a compound of the following Chemical Formula A15 was gradually introduced together with 40 g of NMP in three portions. When the introduced compounds were completely dissolved, 16 g of toluene was added to the reactant to form an azeotrope. Dean-Stark equipment and a reflux condenser were installed, and the Dean-Stark equipment was filled with toluene. 4.2 mL of pyridine was introduced as a dehydrogenation condensation catalyst, a temperature was raised to 170° C., and the solution was stirred for 3 hours. While removing water generated with the formation of an imide ring with the Dean Stark equipment, the solution was additionally stirred for 2 hours, and the remaining toluene and pyridine were removed. The reaction product was cooled to room temperature, and precipitated in methanol to recover. The recovered precipitate was extracted with methanol to remove remaining reactants, and dried in a vacuum oven to obtain a compound of the Chemical Formula A14 (CA1) with the yield of about 85 wt %. The $^1$H-NMR analysis results of the obtained compound of Chemical Formula A14 (CA1) is shown in FIG. 3.

Preparation Example 3. Synthesis of a Curing Agent Compound (CA2)

Figure 4:
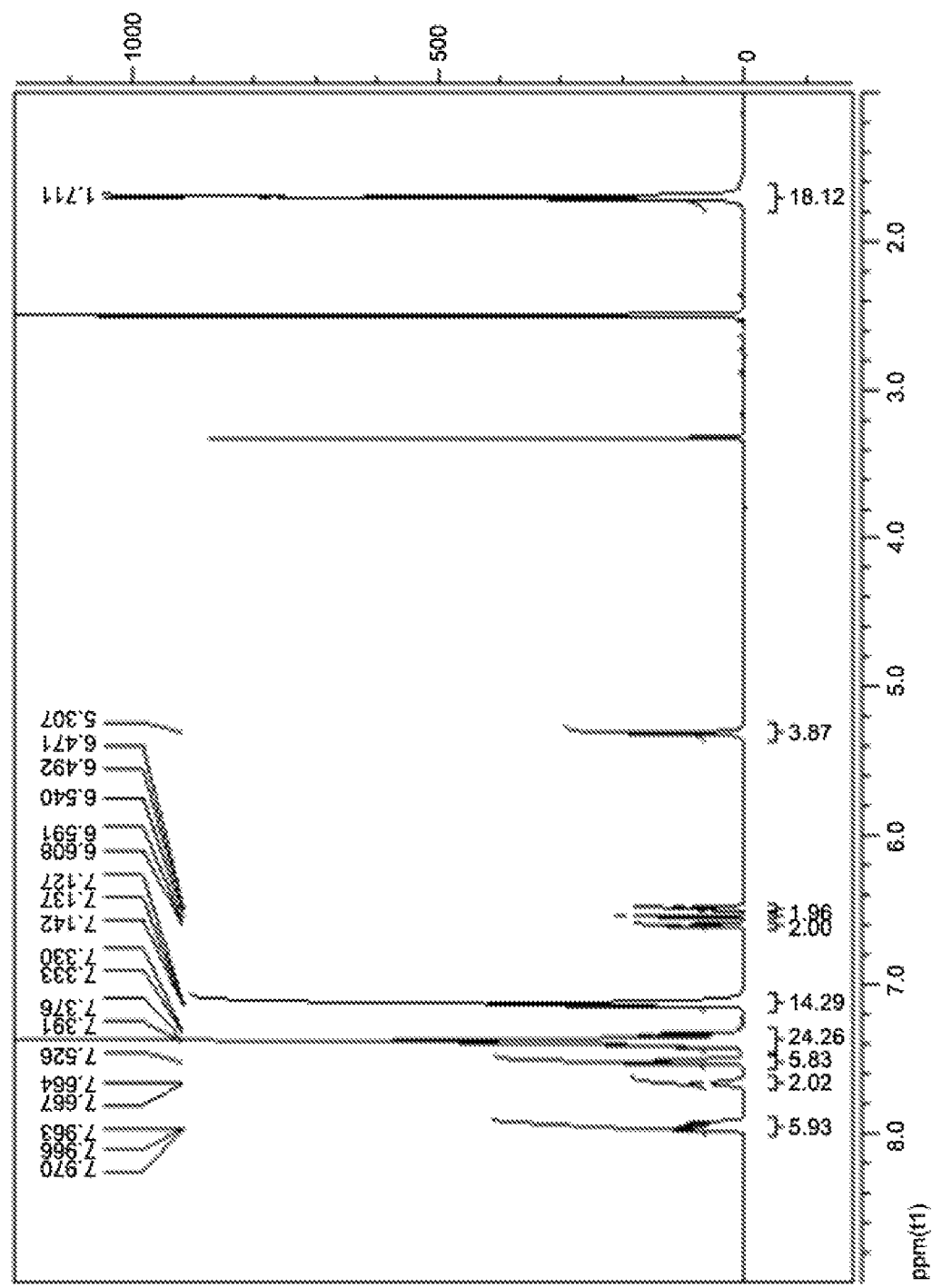

A compound of the following Chemical Formula A18 (CA2) was synthesized by dehydrogenation condensation of diamine and dianhydride. 8.1 g of a compound of the following Chemical Formula A16 (m-phenylene diamine) and 50 g of NMP (N-methyl-pyrrolidone) were introduced into a 3 neck round bottom flask, and stirred at room temperature to dissolve. The solution was cooled with a water bath, and 26 g of a compound of the following Chemical Formula A17 was gradually introduced together with 60 g of NMP in three portions. When the introduced compounds were completely dissolved, 23 g of toluene was added to the reactant to form an azeotrope. Dean-Stark equipment and a reflux condenser were installed, and the Dean-Stark equipment was filled with toluene. 5.2 mL of pyridine was introduced as a dehydrogenation condensation catalyst, the temperature was raised to 170° C., and the solution was stirred for 3 hours. While removing water generated with the formation of an imide ring with the Dean Stark equipment, the solution was additionally stirred for 2 hours, and the remaining toluene and pyridine were removed. The reaction product was cooled to room temperature, and precipitated in methanol to recover. The recovered precipitate was soxhlet extracted with methanol to remove remaining reactants, and dried in a vacuum oven to obtain a compound of Chemical Formula A18 (CA2) with the yield of about 93 wt %. The $^1$H-NMR analysis results of the obtained compound of the Chemical Formula A18 (CA2) is shown in FIG. 4.

Chemical Formula A16

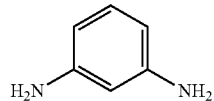

Chemical Formula A17

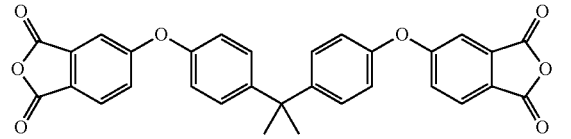

Chemical Formula A18

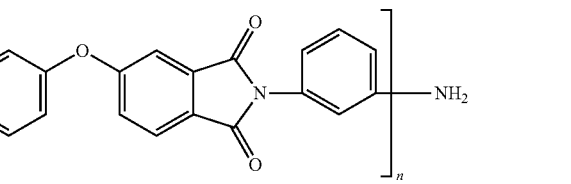

In Chemical Formula A18, n is about 3.

Example 1

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 21.4 parts by weight of graphite (manufacturing company: Samchun chemicals, powder having a particle diameter of 100 μm or less), 14.2 parts by weight of tungsten disulfide ($WS_2$, manufacturing company: Zerofriction, particle diameter 800 nm), and 7.14 parts by weight of polytetrafluoroethylene (PTFE, manufacturing company: DuPont, particle diameter 4 μm) were added, and then, they were thoroughly mixed to prepare a resin composite.

Example 2

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 21.4 parts by weight of graphite (manufacturing company: Samchun chemicals, powder having a particle diameter 100 μm or less), 7.1 parts by weight of molybdenum disulfide ($MoS_2$, manufacturing company: Sigma-Aldrich, particle diameter 2 μm), and 14.2 parts by weight of milled carbon fiber (mCF, manufacturing company: Zoltek, length 100 μm) were added, and then, they were thoroughly mixed to prepare a resin composite.

Example 3

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 23.1 parts by weight of graphite (manufacturing company: Samchun chemicals, powder having a particle diameter 100 μm or less), 15.4 parts by weight of tungsten disulfide ($WS_2$, manufacturing company: Zerofriction, particle diameter 800 nm), and 15.4 parts by weight of polytetrafluoroethylene (PTFE, manufacturing company: DuPont, particle diameter 4 μm) were added, and then, they were thoroughly mixed well to prepare a resin composite.

Comparative Example 1

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 17.6 parts by weight of graphite (manufacturing company: Samchun chemicals, powder having a particle diameter of 100 μm or less) was added, and then, they thoroughly mixed to prepare a resin composite.

Comparative Example 2

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 20.0 parts by weight of graphite (manufacturing company: Samchun chemicals, powder having a particle diameter of 100 μm or less) and 13.3 parts by weight of polytetrafluoroethylene (PTFE, manufacturing company: DuPont, particle diameter 4 μm) were added, and then, they were thoroughly mixed to prepare a resin composite.

Comparative Example 3

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 20.0 parts by weight of graphite (manufacturing company: Samchun chemicals, powder having a particle diameter of 100 μm or less) and 13.3 parts by weight of tungsten disulfide ($WS_2$, manufacturing company: Zerofriction, particle diameter 800 nm) were added, and then, they were thoroughly mixed to prepare a resin composite.

Comparative Example 4

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 18.8 parts by weight of graphite (manufacturing company: Samchun chemicals, powder having a particle diameter of 100 μm or less) and 6.3 parts by weight of molybdenum disulfide (MoS$_2$, manufacturing company: Sigma-Aldrich, particle diameter 2 μm) were added, and then, they were thoroughly mixed to prepare a resin composite.

Comparative Example 5

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 20.0 parts by weight of graphite (manufacturing company: Samchun chemicals, powder having a particle diameter of 100 μm or less) and 13.3 parts by weight of milled carbon fiber (mCF, manufacturing company: Zoltek, length 100 μm) were added, and then, they were thoroughly mixed to prepare a resin composite.

Comparative Example 6

A low friction grade product Vespel-SP21 from DuPont Company was commercially acquired and used. The Vespel-SP21 product is known to contain polyimide resin and 15 wt % of graphite (based on 100 parts by weight of PI resin, 17.6 parts by weight of graphite).

Comparative Example 7

A low friction grade product PEEK 450FC30 from Victrex Company was commercially acquired and used. The PEEK 450FC30 product is known to contain 30 parts by weight of fillers (a mixture of carbon fiber, graphite and PTFE), based on 100 parts by weight of polyetheretherketone resin.

Reference Example 1

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 21.4 parts by weight of molybdenum disulfide (MoS$_2$, manufacturing company: Sigma-Aldrich, particle diameter 2 μm), 14.2 parts by weight of tungsten disulfide (WS$_2$, manufacturing company: Zerofriction, particle diameter 800 nm), and 7.14 parts by weight of polytetrafluoroethylene (PTFE, manufacturing company: DuPont, particle diameter 4 μm) were added, and then, they were thoroughly mixed to prepare a resin composite.

Reference Example 2

100 parts by weight of the compound of Preparation Example 1 (PN1), and based on 1 mole of the compound (PN1), about 0.18 moles of the compound of Preparation Example 3 (CA1) were mixed to prepare a binder.

To 100 parts by weight of the binder, 21.4 parts by weight of milled carbon fiber (mCF, manufacturing company: Zoltek, length 100 μm), 14.2 parts by weight of tungsten disulfide (WS$_2$, manufacturing company: Zerofriction, particle diameter 800 nm), and 7.14 parts by weight of polytetrafluoroethylene (PTFE, manufacturing company: DuPont, particle diameter 4 μm) were added, and then, they were thoroughly mixed to prepare a resin composite.

Experimental Example

Each resin composite prepared in Examples and Comparative Examples was melted at 240° C. and stirred for 5 minutes to prepare prepolymer.

The prepolymer was put in a mold and melted, and then, cured under conditions of 200° C. for 2 hours, 250° C. for 2 hours, 300° C. for 2 hours and 350° C. for 2 hours to prepare thrust washer test specimens according to ASTM D3702 standard. And, the products of Comparative Examples 5 and 6 were cut to prepare thrust washer test specimens according to ASTM D3702 standard.

As carbon steel subject material, S45C was prepared. S45C means carbon steel material for machine structure, which is steel material containing 0.45% of carbon according to JIS G4053 standard.

The friction coefficient and wear rate of the test specimens were measured using a friction coefficient measuring device (TE 92, manufactured by Phoenix Company) according to ASTM D3702. The results were shown in the following Tables 1 and 2.

PV Value 1: 2.3 MPa·m/s (pressure(P): 1.63 MPa(16 bar, 220 N), rotation speed(V): 1.41 m/s(1000 rpm))

PV Value 2: 4.6 MPa·m/s (pressure(P): 1.63 MPa(16 bar, 220 N), rotation speed(V): 2.82 m/s(1000 rpm))

Time: 1200 s

Unlubricated conditions

Lubricated conditions (automobile lubricating oil, sales company: HYUNDAI MOBIS, product name: ATF SP-III)

TABLE 1

| | | | PV Value 1 + unlubricated | |
|---|---|---|---|---|
| | Binder | Filler | Friction coefficient | Wear rate ($10^{-10}$ m/s) |
| Example 1 | phthalonitrile | graphite, WS$_2$, PTFE | 0.088 | 80.5 |
| Example 2 | phthalonitrile | graphite, MoS$_2$, mCF | 0.164 | 123.9 |
| Example 3 | phthalonitrile | graphite, WS$_2$, PTFE | 0.137 | 80.5 |
| Comparative Example 1 | phthalonitrile | graphite | 0.230 | 161.7 |
| Comparative Example 2 | phthalonitrile | graphite, PTFE | 0.112 | 168.9 |
| Comparative Example 3 | phthalonitrile | graphite, WS$_2$ | 0.190 | 175.2 |
| Comparative Example 4 | phthalonitrile | graphite, MoS$_2$ | 0.236 | 167.1 |
| Comparative Example 5 | phthalonitrile | graphite, mCF | 0.220 | — |
| Reference Example 1 | phthalonitrile | WS$_2$, PTFE, MoS$_2$ | 0.211 | 187.5 |
| Reference Example 2 | phthalonitrile | WS$_2$, PTFE, mCF | 0.182 | 201.5 |
| Comparative Example 6 | PI | graphite | 0.297 | 360.1 |
| Comparative Example 7 | PEEK | graphite, PTFE, mCF | 0.180 | 56.9 |

TABLE 2

| | binder | Filler | PV Value 2 + lubricated Friction coefficient | Wear rate ($10^{-10}$ m/s) |
|---|---|---|---|---|
| Example 1 | phthalonitrile | graphite, WS$_2$, PTFE | 0.052 | — |
| Example 2 | phthalonitrile | graphite, MoS$_2$, mCF | 0.051 | — |
| Example 3 | phthalonitrile | graphite, WS$_2$, PTFE | 0.053 | — |
| Comparative Example 1 | phthalonitrile | graphite | 0.074 | — |
| Comparative Example 2 | phthalonitrile | graphite, PTFE | 0.110 | — |
| Comparative Example 3 | phthalonitrile | graphite, WS$_2$ | 0.108 | — |
| Comparative Example 4 | phthalonitrile | graphite, MoS$_2$ | 0.119 | — |
| Comparative Example 5 | phthalonitrile | graphite, mCF | 0.075 | — |
| Reference Example 1 | phthalonitrile | WS$_2$, PTFE, MoS$_2$ | 0.092 | — |
| Reference Example 2 | phthalonitrile | WS$_2$, PTFE, mCF | 0.102 | — |
| Comparative Example 6 | PI | graphite | 0.052 | — |
| Comparative Example 7 | PEEK | graphite, PTFE, mCF | 0.055 | — |

Referring to Table 1, it is confirmed that the test specimens according to Examples 1 to 3 exhibit low friction coefficients or low wear rates, compared to the test specimens of Comparative Examples 1 to 5.

Particularly, as confirmed through Examples 1, 3 and Comparative Example 3, in case graphite and tungsten disulfide were used as filler, when applying polytetrafluoroethylene together, friction property was remarkably improved.

And, as confirmed through Example 2 and Comparative Example 4, in case graphite and molybdenum disulfide were used as filler, when applying milled carbon fiber together, friction property was remarkably improved.

The invention claimed is:

1. A low friction resin composite comprising:
   a binder comprising phthalonitrile-based resin; and
   fillers dispersed in the binder,
   wherein the fillers comprise graphite, and two or more selected from the group consisting of polytetrafluoroethylene, tungsten disulfide, molybdenum disulfide, and milled carbon fiber, and
   wherein the fillers are powder additives having a longest diameter of 0.01 to 100 μm.

2. The low friction resin composite according to claim 1, comprising:
   100 parts by weight of the binder comprising phthalonitrile-based resin; and
   1 to 100 parts by weight of the fillers.

3. The low friction resin composite according to claim 1, wherein the composite comprises, based on 100 parts by weight of the binder comprising phthalonitrile-based resin:
   15 to 30 parts by weight of graphite; and
   10 to 40 parts by weight of fillers selected from the group consisting of polytetrafluoroethylene, tungsten disulfide, molybdenum disulfide, and milled carbon fiber.

4. The low friction resin composite according to claim 1, wherein the binder comprising phthalonitrile-based resin is obtained by curing a composition containing a phthalonitrile compound by one or more curing agents selected from the group consisting of an amine-based compound, a hydroxy-based compound, and an imide-based compound.

5. The low friction resin composite according to claim 4, wherein the phthalonitrile compound is a compound of the following Chemical Formula P1:

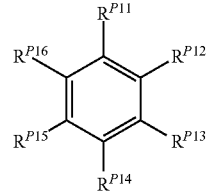

Chemical Formula P1 wherein in Chemical Formula P1, each of $R^{P11}$ to $R^{P16}$ is independently, hydrogen, a $C_{1-5}$ alkyl group, $C_{1-5}$ alkoxy group, $C_{6-30}$ aryl group, a group of the following Chemical Formula P2, or a group of the following Chemical Formula P3, and two or more of $R^{P11}$ to $R^{P16}$ are a group of the following Chemical Formula P2 or a group of the following Chemical Formula P3:

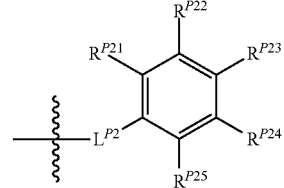

Chemical Formula P2 wherein in Chemical Formula P2:
$L^{P2}$ is a direct bond, a $C_{1-5}$ alkylene group, —O—, —S—, —C(=O)—, —S(=O)—, or —S(=O)$_2$—;
each of $R^{P21}$ to $R^{P25}$ is independently, hydrogen, a $C_{1-5}$ alkyl group, a $C_{1-5}$ alkoxy group, a $C_{6-30}$ aryl group, or a cyano group; and
two or more of $R^{P21}$ to $R^{P25}$ are cyano groups,

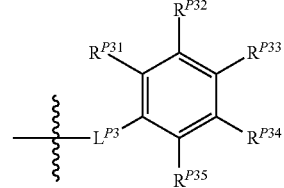

Chemical Formula P3 wherein in Chemical Formula P3:
$L^{P3}$ is a direct bond, a $C_{1-5}$ alkylene group, —O—, —S—, —C(=O)—, —S(=O)—, —S(=O)$_2$—, —C(CH$_3$)$_2$—, —C(CF$_3$)$_2$—, or —C(=O)NH—;
each of $R^{P31}$ to $R^{P35}$ is independently, hydrogen, a $C_{1-5}$ alkyl group, a $C_{1-5}$ alkoxy group, a $C_{6-30}$ aryl group, or the group of Chemical Formula P2; and
one or more of $R^{P31}$ to $R^{P35}$ are the group of Chemical Formula P2.

6. The low friction resin composite according to claim 4, wherein the curing agent is an imide-based compound of the following Chemical Formula 9:

Chemical Formula 9

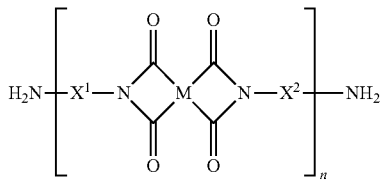

wherein in Chemical Formula 9:
M is a tetravalent radical derived from an aliphatic, alicyclic or aromatic compound;
each of $X^1$ and $X^2$ is independently, an alkylene group, an alkylidene group, or a divalent radical derived from an aromatic compound; and
n is a number equal to or greater than 1.

7. The low friction resin composite according to claim 6, wherein M in Chemical Formula 9 is a tetravalent radical derived from alkane, alkene, or alkyne, or a tetravalent radical derived from a compound of any one of the following Chemical Formulas 10 to 15:

Chemical Formula 10

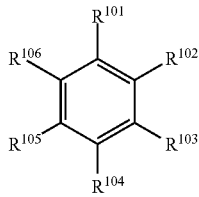

wherein in Chemical Formula 10, each of $R^{101}$ to $R^{106}$ is independently, hydrogen, an alkyl group, an alkoxy group, or an aryl group;

Chemical Formula 11

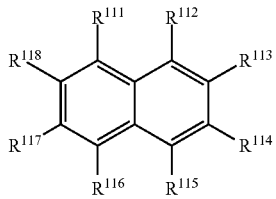

wherein in Chemical Formula 11, each of $R^{111}$ to $R^{118}$ is independently, hydrogen, an alkyl group, an alkoxy group, or an aryl group;

Chemical Formula 12

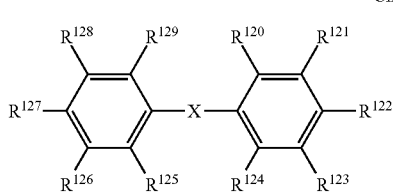

wherein in Chemical Formula 12:
each of $R^{120}$ to $R^{129}$ is independently, hydrogen, an alkyl group, an alkoxy group, or an aryl group,
X is a single bond, an alkylene group, an alkylidene group, —O—, —S—, —C(=O)—, —S(=O)—, —S(=O)$_2$—, —C(=O)—O-$L^1$—O—C(=O)—, -$L^2$-C(=O)—O-$L^3$-, -$L^4$-O—C(=O)-$L^5$-, or -$L^6$-$Ar^1$-$L^7$-$Ar^2$-$L^8$-;
each of $L^1$ to $L^8$ is independently, a single bond, —O—, an alkylene group, or an alkylidene group; and
each of $Ar^1$ and $Ar^2$ is independently, an arylene group;

Chemical Formula 13

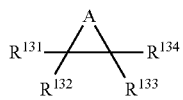

wherein in Chemical Formula 13:
each of $R^{131}$ to $R^{134}$ is independently, hydrogen, an alkyl group, or an alkoxy group, and two of $R^{131}$ to $R^{134}$ can be connected to each other to form an alkylene group;
A is an alkylene group or an alkenylene group, and the alkylene group or alkenylene group of A can comprise one or more oxygen atoms as a hetero atom;

Chemical Formula 14

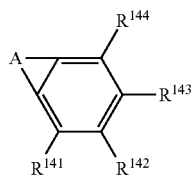

wherein in Chemical Formula 14:
each of $R^{141}$ to $R^{144}$ is independently, hydrogen, an alkyl group, or an alkoxy group; and
A is an alkylene group;

Chemical Formula 15

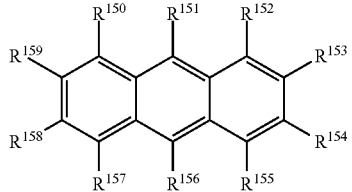

wherein in Chemical Formula 15:
each of $R^{150}$ to $R^{159}$ is independently, hydrogen, an alkyl group, or an alkoxy group.

8. The low friction resin composite according to claim 6, wherein in the Chemical Formula 9, n is a number in the range of 2 to 200.

9. The low friction resin composite according to claim 1, wherein a friction coefficient under a non-lubricated condition, measured for a thrust washer test specimen having a contact area of 1.3 cm$^2$ against carbon steel friction subject material under PV Value of 2.3 MPa·m/s according to ASTM D3702, is 0.175 or less.

10. The low friction resin composite according to claim 1, wherein a friction coefficient under a lubricated (lubricant: automobile lubricating oil) condition, measured for a thrust washer test specimen having a contact area of 1.3 cm$^2$ against carbon steel friction subject material under PV Value of 4.6 MPa·m/s according to ASTM D3702, is 0.060 or less.

11. A relative friction component material comprising the low friction resin composite of claim 1.

12. The relative friction component material according to claim 11, wherein the relative friction component material is a bearing, a bushing, a thrust washer, an oil seal, a piston ring, a sliding, or a roller.

* * * * *